US009946026B2

(12) United States Patent
Spector et al.

(10) Patent No.: US 9,946,026 B2
(45) Date of Patent: Apr. 17, 2018

(54) REDUCED PUPIL INTEGRATED OPTICAL SYSTEM USING PRECISELY MATCHED OPTICAL PATHLENGTHS

(71) Applicant: The Charles Stark Draper Laboratory, Inc., Cambridge, MA (US)

(72) Inventors: Steven Spector, Lexington, MA (US); Benjamin Lane, Sherborn, MA (US)

(73) Assignee: The Charles Stark Draper Laboratory, Inc., Cambridge, MA (US)

( * ) Notice: Subject to any disclaimer, the term of this patent is extended or adjusted under 35 U.S.C. 154(b) by 0 days.

(21) Appl. No.: 15/621,526

(22) Filed: Jun. 13, 2017

(65) Prior Publication Data
US 2017/0357055 A1 Dec. 14, 2017

Related U.S. Application Data

(60) Provisional application No. 62/349,856, filed on Jun. 14, 2016.

(51) Int. Cl.
*G02B 6/293* (2006.01)
*G02B 23/00* (2006.01)
(Continued)

(52) U.S. Cl.
CPC ............ *G02B 6/293* (2013.01); *G02B 6/122* (2013.01); *G02B 6/4215* (2013.01); *G02B 23/00* (2013.01); *G02B 6/4203* (2013.01); *G02B 6/4249* (2013.01)

(58) Field of Classification Search
CPC ........ G02B 23/00; G02B 6/122; G02B 6/293; G02B 6/42; G02B 6/4203; G02B 6/4215; G02B 6/4249
See application file for complete search history.

(56) References Cited

U.S. PATENT DOCUMENTS 4,814,774 A    3/1989   Herczfeld
4,953,964 A    9/1990   Anafi et al.
(Continued)

FOREIGN PATENT DOCUMENTS

EP    3 043 160 A2    7/2016

OTHER PUBLICATIONS

Lardiere, O. et al., "Direct Imaging with Highly Diluted Apertures—I. Field-of-View Limitations," Monthly Notices of the Royal Astronomical Society, No. 375, pp. 977-988, 2007. Twelve pages.
(Continued)

*Primary Examiner* — Andrew Jordan
(74) *Attorney, Agent, or Firm* — HoustonHogle LLP

(57) ABSTRACT

An imaging system comprises a matched pathlength combining waveguide array including input optical couplers for receiving light, combining waveguides for combining the light received from different input optical couplers and relaying the light to output optical couplers. A lens system is also provided for imaging the light from the output optical couplers. Compared to imaging systems, this imaging system can be much more compact. A standard imaging system requires a focal length at least equal to the aperture (width) of the lens. Because the aperture size of a lens determines the performance of a system (resolution and collected light) there is a limit to how compact a traditional high performance imaging system can be. In contrast, the present system removes that limitation because the minimum practical focal length is now determined by the size of the aperture of the outputs, which can be significantly smaller (by factors of more than 10×, typically).

20 Claims, 8 Drawing Sheets

(51) Int. Cl.
  *G02B 6/122* (2006.01)
  *G02B 6/42* (2006.01)

(56) References Cited

U.S. PATENT DOCUMENTS

| | | | |
|---|---|---|---|
| 5,747,796 A | 5/1998 | Heard et al. | |
| 7,187,815 B1 | 3/2007 | Sweatt et al. | |
| 7,522,337 B2 | 4/2009 | Chen et al. | |
| 7,529,435 B2* | 5/2009 | West | G02B 6/12004 385/14 |
| 7,949,262 B2* | 5/2011 | Cho | B82Y 20/00 385/15 |
| 8,098,185 B2* | 1/2012 | Ridgway | G01S 7/03 342/175 |
| 9,019,509 B2* | 4/2015 | Laine | G01C 21/025 250/203.6 |
| 9,372,250 B2* | 6/2016 | Laine | G01C 21/025 |
| 9,413,448 B2* | 8/2016 | Ashrafi | H04B 7/0697 |
| 2005/0053383 A1* | 3/2005 | West | G02B 6/12004 398/153 |
| 2009/0269083 A1 | 10/2009 | Cho et al. | |
| 2015/0002854 A1 | 1/2015 | Laine et al. | |
| 2015/0226830 A1* | 8/2015 | Laine | G01C 21/025 356/510 |
| 2016/0043794 A1* | 2/2016 | Ashrafi | H04B 7/0697 370/329 |
| 2016/0245895 A1 | 8/2016 | Lane et al. | |
| 2016/0282441 A1* | 9/2016 | Laine | G01C 21/025 |
| 2016/0359539 A1* | 12/2016 | Ashrafi | H04B 7/0697 |
| 2017/0357055 A1* | 12/2017 | Spector | G02B 6/293 |

OTHER PUBLICATIONS

Saleh, B. et al., "Fundamentals of Photonics," Chapter 2: Wave Optics, pp. 41-79. 1991: John Wiley & Sons, Inc. Thirty-nine pages.
International Search Report and the Written Opinion of the International Searching Authority, dated Aug. 28, 2017, from International Application No. PCT/US2017/037221, filed on Jun. 13, 2017. Sixteen pages.

* cited by examiner

REDUCED PUPIL INTEGRATED OPTICAL SYSTEM USING PRECISELY MATCHED OPTICAL PATHLENGTHS

RELATED APPLICATIONS

This application claims the benefit under 35 USC 119(e) of U.S. Provisional Application No. 62/349,856, filed on Jun. 14, 2016, which is incorporated herein by reference in its entirety.

BACKGROUND OF THE INVENTION

Phased array transmitters are typically composed of a regular two-dimensional array of radiating or transmitting elements. Each of these elements typically has an associated phase shifter. Beams are formed by shifting the phase of the signal emitted by each of the radiating elements. The result is constructive and destructive interference in the far field that enables the steering of the beam.

The same principle can be applied to phased array receivers. Similarly, a two-dimensional array of antenna or detection elements receives the incoming radiation. Their corresponding phase shifters shift the relative phase of the signals from each of the detection elements in order to create the constructive interference based on the incoming signal's angle of incidence on the receiver.

Traditionally, phased array systems have been common in RADAR systems. These systems operate in the radio frequency regime, in the Megahertz to GigaHertz frequencies. More recently, optical phased array systems are being proposed and built.

For example, the present inventors have proposed a variant of traditional phased array systems called Zero Optical Path Difference Phased Arrays. These are described in US Pat. Appl. Pub. No. 2016/0245895 A1, which is incorporated herein by this reference in its entirety. This concerns zero-optical-pathlength-difference optical phased arrays built with essentially planar photonic devices. They were proposed to be used to determine a direction to an incoherent optical source, such as a star, in one example. The zero-optical-pathlength-difference phased arrays were optically connected to interferometers.

At the same time, other have proposed to use systems of microlenses, waveguides and output lenses for imaging applications. U.S. Pat. No. 7,187,815 describes wavefront relay devices that sample an incoming optical wavefront at different locations, optically relay the samples while maintaining the relative position of the samples and the relative phase between the samples. The wavefront is reconstructed due to interference of the samples, but on a smaller scale, i.e., reduced pupil. In one application, the device could function as a telescope but with negligible length.

SUMMARY OF THE INVENTION

This invention builds on a number of aspects of reduced pupil imaging on integrated platforms. It can be used to provide reduced pupil imaging where the incident wavefront is recreated at a smaller scale, and re-imaged. Lens arrays on the input couplers and output couplers can be used to improve light collection and limit background interference. The present system further provides precise pathlength control, which can be achieved with micro-fabrication techniques and trimming and active tuning. Further, the field-of-view can be steered by altering the pathlengths in a controlled manner to produce a desired effect at the output, such as steering and focusing. There is the method for using combining waveguides such as H-trees to combine the light and lower the number of output couplers necessary. The combination of a reduced pupil, H-tree arrays, and various modes of steering enable a very compact optical system with high performance.

The present invention concerns a system that relays an incoming wavefront using waveguides. This can be used to reduce the effective pupil size for any subsequent imaging optics. It further utilizes matched pathlength optical waveguides to sample the incoming wavefront at multiple locations and then reproduce that wavefront. The relative optical lengths of the waveguides can be tuned, however, in order to steer the field-of-view. Moreover, the present invention uses networks of combining waveguides. This has the effect of combining the samples received at multiple, distributed input couplers into a single sample that is transferred to an output coupler. As a result, the present system is much more optically efficient and able to be more easily integrated, due to a reduced number of output couplers.

Compared to a standard lens system, this imaging system can be much more compact. A standard imaging system requires a focal length at least equal to the aperture (width) of the lens. Because the aperture size of a lens determines the performance of a system (resolution and collected light) there is a limit to how compact a traditional high performance imaging system can be. In contrast, the present system removes that limitation because the minimum practical focal length is now determined by the size of the aperture of the output optical couplers, which can be significantly smaller (by factors of more than 10×, typically).

In general, according to one aspect, the invention features an imaging system. The system comprises a matched pathlength combining waveguide array including input optical couplers for receiving light, combining waveguides for combining the light received from different input optical couplers and relaying the light to output optical couplers. A lens system is also provided for imaging the light from the output optical couplers.

In the illustrated embodiments, the matched pathlength combining waveguide array comprises a series of matched pathlength combining waveguide tiles, each comprising a multiple input couplers feeding an output coupler. Each of the tiles can comprise at least 4 or 8 input optical couplers for every output coupler. There could be at least a 4 by 4 array of the tiles. In other cases, however, there is at least a 64 by 64 array of the tiles.

In examples, the combining waveguides comprise waveguides for guiding the light to optical combiners that combine the light from multiple waveguides.

Each of the tiles should include a phase shifting system for shifting the phase of the light to steer a field-of-view. A phase jump tuner is also useful for providing incremental phase shifts to enable steering to higher angles.

In general, according to another aspect, the invention features an imaging method. This method comprises receiving light at an array input optical couplers, combining the from the input optical couplers in a matched pathlength combining waveguide array, emitting the combined light from output optical couplers, and imaging the light from the output optical couplers.

In general, according to still another aspect, the invention features an imaging system. It comprises a waveguide array including input optical couplers for receiving light and relaying the light to output optical couplers, a lens system for imaging the light from the output optical couplers, and a phase shifting system for shifting the phase of the light to steer a field-of-view.

This phase shifting system can include a phase jump tuner for providing incremental phase shifts to enable steering to higher angles.

In general, according to still another aspect, the invention an imaging method. This method comprises receiving light at an array input optical couplers and coupling the light into a waveguide array, shifting the phase of the light in the waveguide array to steer a field-of-view, emitting the light from output optical couplers, and imaging the light from the output optical couplers.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

Figure 1:
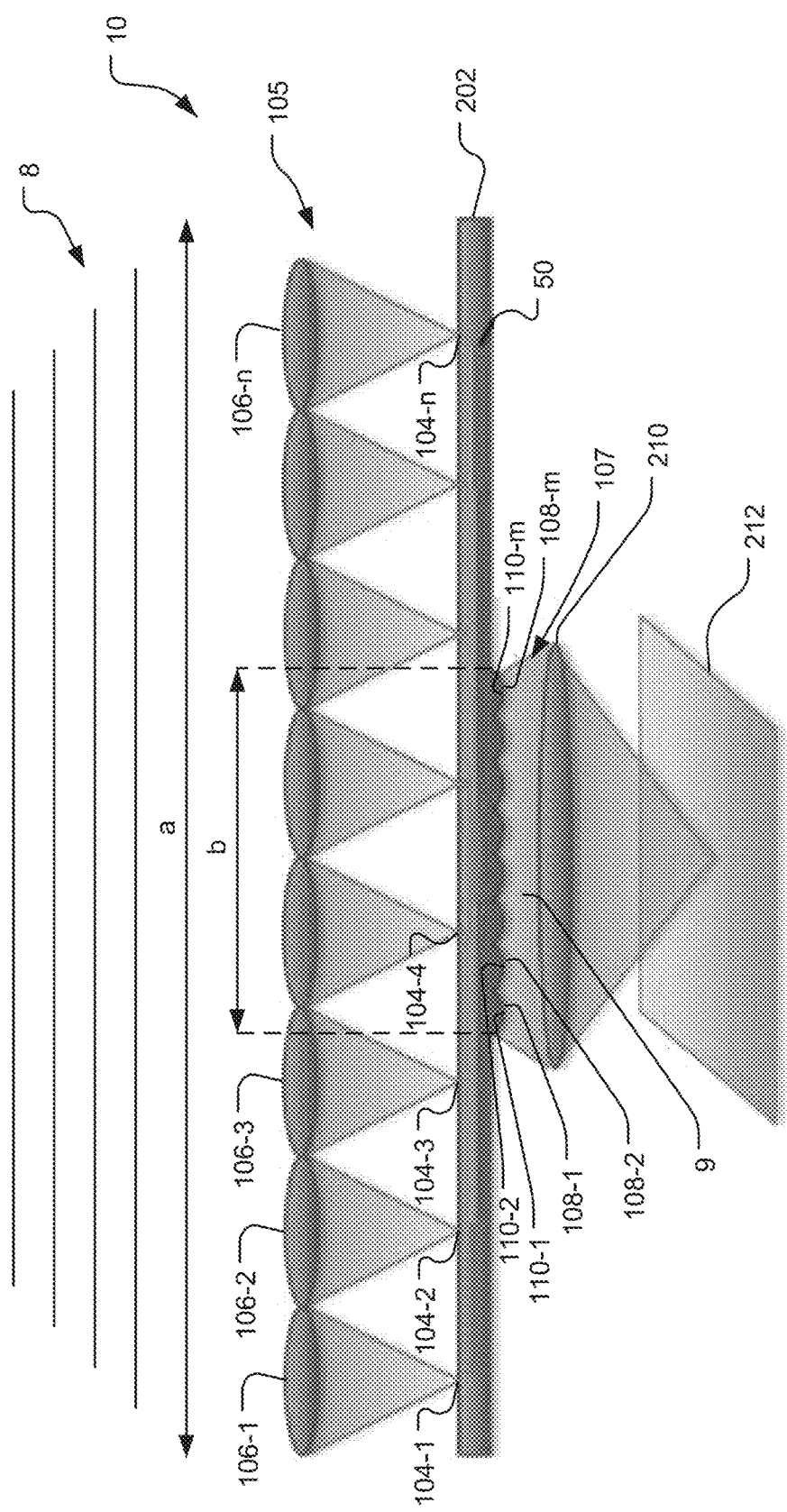
FIG. 1 is a schematic side view of an imaging system according to the present invention.

FIG. 1 shows a reduced pupil imaging system 10 which has been constructed according to the principles of the present invention.

The incoming optical wavefront of light 8 is captured by an input lens array 105. The input lens array 105 comprises an array of lenslets 106-1, 106-2, 106-3, . . . , 106-n. These lenslets 106 focus the incoming light onto an corresponding array of optical input couplers 104-1, 104-2, 104-3, 104-4, . . . , 104-n that are arranged on a top face of a waveguide chip 202.

Although not strictly necessary, the lens array 105 provides increased collection of the desired light while reducing the collection of unwanted light that is outside the field-of-view.

The input couplers 104 can be implemented a number of ways. Examples include gratings, etched mirrors, and plasmonic antennae.

These input optical couplers couple the incoming light into a matched pathlength combining waveguide array 50 that is implemented in the waveguide chip 202. This matched pathlength combining waveguide array 50 transmits the light to an array of output optical couplers 110-1, 110-2, 110-3, . . . , 104-m.

Preferably, number (m) of output optical couplers 110 is less than the number (n) of optical input couplers 104. This is a consequence of the combining waveguide array 50. This has the advantage of reducing space contention on the waveguide chip 202 as the waveguides converge to the output couplers 110. In one example, the ratio of input couplers 104 to optical couplers 110 is greater than 4:1, and is usually greater than 16:1

In addition, for many embodiments, lateral extent (b) (length and width) of the array of output optical couplers 110 is smaller than the lateral extent (a) (length and width) of the array of input couplers 104. As a result, the waveguide chip 202 has the effect of reducing the pupil size of the imaging system 10 over typical lens-base imaging systems. In a typical example, the lateral extent (a) of the array of input couplers 104 is at least four times larger than the lateral extent (b) of the array of output couplers 110.

The light travels across the chip 202 and is then re-emitted using a similar shaped, but more compact array of output couplers 110. If the waveguide pathlengths are kept exactly equal, this new wavefront is identical (except smaller) then the incident wavefront 8. This new wavefront can be reimaged using standard optics (which is much smaller than that which would be necessary to image the original wavefront), producing an image that contains all the resolution information in the original wavefront.

In some embodiments, the waveguide chip 202 is a silicon wafer. The matched pathlength combining waveguide array 50 is fabricated within a thickness of the chip 202. The optical waveguides may be made of glass or another material that is optically transparent at wavelengths of interest. The optical waveguides may be solid or they may be hollow, such as a hollow defined by a bore in the thickness of the wafer, and partially evacuated or filled with gas, such as air or dry nitrogen. The optical waveguides may be defined by a difference between a refractive index of the optical medium of the waveguides and a refractive index of the substrate or other material surrounding the optical waveguides. The waveguide chip may be fabricated using conventional semiconductor fabrication processes, such as the conventional CMOS process.

An output lens array 107 comprises output lenslets 108-1, 108-2, . . . , 108-$m$, corresponding to the array of output couplers 110. These guide the light exiting from the waveguide chip 202 to imaging optics 210. The imaging optics 210 then forms an image at an image plane. In the illustrated example, an image detector 212, such as a CCD array or CMOS detector is located at the image plane in order to detect the image.

Although resolution is preserved, field-of-view is sacrificed. The field-of-view can be steered, however, by moving the lens array. For this method to work, precise pathlength control is necessary to preserve the wavefront. Although current fabrication methods are extremely precise, some fine tuning, such as active phase shifters are expected to be required to achieve the sub-wavelength control necessary for this application.

It is also possible to alter the waveguide pathlengths in a controlled manner to produce desired results at the output. For example, a lens can be effectively built into the waveguides by altering the pathlengths to produce the same pathlength delays that an additional lens would. It is also possible to alter the locations of the outputs to produce a similar effect.

Figure 2:
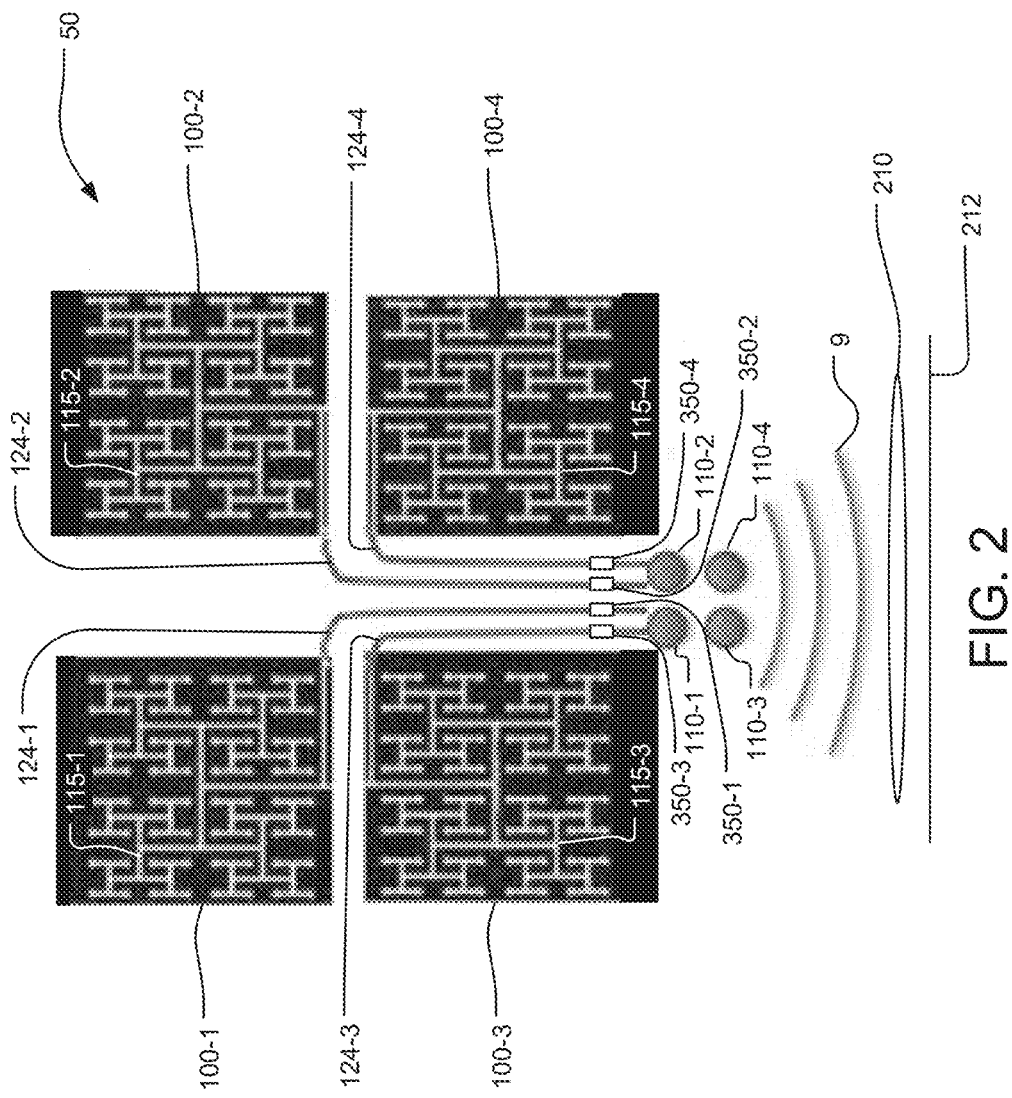
FIG. 2 is a schematic plan view of the imaging system showing the arrangement of several matched pathlength combining waveguide tiles.

FIG. 2 shows the arrangement of the matched pathlength waveguide tiles in the matched pathlength combining waveguide array 50.

In the illustrated example, the waveguides are arranged into several matched pathlength combining waveguide tiles 100-1, 100-2, 100-3, 100-4. Each of these tiles 100 combines the light received at several optical input couplers 104 and combines the feeds from those input couplers, successively, through a branching waveguide network 115 until the light from the optical couplers 104 for a tile 100 is combined onto a final root waveguide 124 that terminates in an output coupler 110.

In general, the average phase is preserved through the tiles 100, and then the output couplers 110 of the tiles 100 are arranged in an array to produce a smaller copy of the incident wavefront. This method can be used to reduce the number of output elements necessary. Although shown in a regular arrangement, other arrangements of the tiles 100 are possible.

In general, a larger field-of-view (without sacrificing resolution) requires more output elements and therefore more complexity. Together these methods create a means for choosing the size of the field-of-view based on the application, while providing methods of steering the field-of-view for a large field-of-view.

Specifically, in the illustrated example, the light received by the input optical couplers 104 of the first matched pathlength combining waveguide tile 100-1, for example, is successively combined in the branching waveguide network 115-1 until the combined optical signal is provided on its corresponding root waveguide 124-1.

All together, the root optical waveguides 124-1, 124-2, 124-3, 124-4 for the respective tiles 100-1, 100-2, 100-3, 100-4 each provide their light to its corresponding optical output coupler 110-1, 110-2, 110-3, 110-4 so that it can be subsequently imaged by the imaging optics 210 onto the image detector 212.

In some embodiments, phase jump tuners 350-1, 350-2, 250-3, 350-4 are further provided on the root waveguides 124-1, 124-2, 124-3, 124-4 of each of the tiles 100-1, 100-2, 100-3, 100-4. These phase jump tuners 350-1, 350-2, 250-3, 350-4 control the relative phases of the light from each of the tiles. These are used to steer the field of view to higher angles by compensating for a tilted wavefront across the extent of the matched pathlength combining waveguide array 50. The jump tuners 350-1, 350-2, 250-3, 350-4 provide each tile 100 incremental jumps in phase delay.

Figure 3:
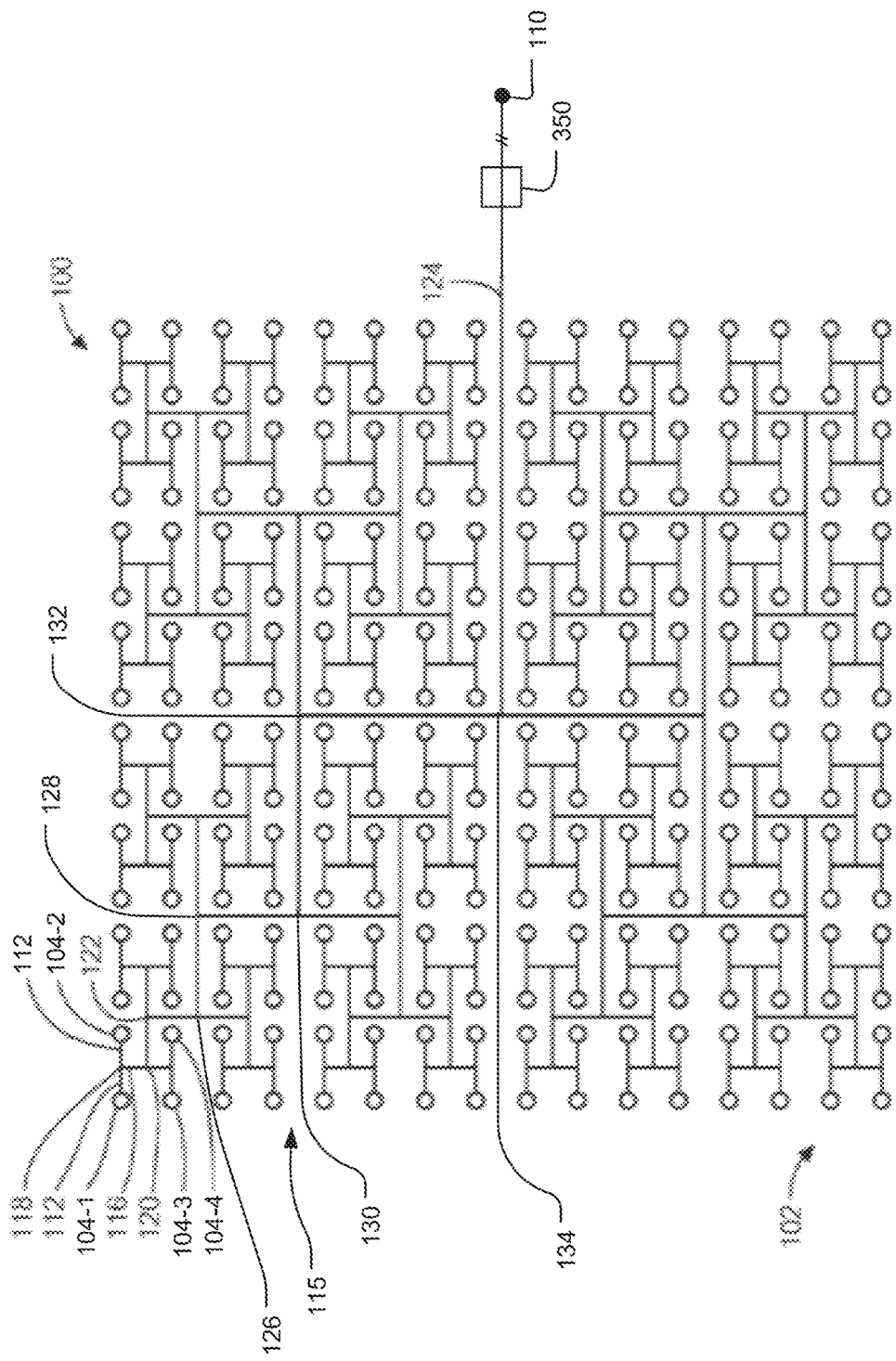
FIG. 3 is a schematic diagram showing a plan view in detail of a single matched pathlength combining waveguide tile.

FIG. 3 is a schematic diagram showing a plan view of a matched pathlength combining waveguide tile 100. This illustrated example shows an H-tree arrangement.

Other arrangements of optical couplers are anticipated, such as arrangements that provide an asymmetric effective field-of-view. Yet other arrangements of optical couplers are also anticipated. For example, X-trees may be used, although X-trees may require crossing optical paths. However, for simplicity, the following examples are described herein using H-trees.

The illustrated tile 100 shows a 32×32 array of input couplers 104 feeding to a single output computer 110. The optical input couplers 104 are connected to leaves or first level waveguides 112 of the H-tree branching waveguide network 115. (For clarify of the figure, only the upper right portion of the branching waveguide network 115 is labeled with reference numerals. Due to the symmetry of the network, this description applies to the other sections as well.) The first level optical waveguides 112 each meet at first level optical combiners 118. The first level optical combiners 118 in turn feed second level waveguides 116. The feeds from the second level waveguides 116 are then combined in second level combiners 120. The second level combiners 120 in turn feed third level combiner 122.

Depending on the depth of the branching waveguide network 115, the optical signals are combined through successive combinations of waveguides and combiners until the root waveguide 124 is reached. In the specific illustrated network, there are fourth level combiners 126, fifth level combiners 128, sixth level combiners 130, and seventh level combiners 132, until a final eighth level combiner 134 feeds the single root waveguide 124.

The optical waveguides of the same level are of matched, specifically equal, lengths. Similarly, other pairs of optical waveguides that meet at common combiners are of equal lengths.

In the illustrated example, the direction of combination alternates (left-right, up-down) between successive optical combiners 118 to 120 to 124 to 126 to 128 to 130 to 132 to 134 to ensure each signal combination occurs in phase. The resulting branching phased array 115 operates over a broad range of wavelengths. The entire array 115 feeds a root optical waveguide 124, which is referred to herein as a "root" of the H-tree.

In some embodiments, the optical couplers 104 are sized and spaced apart by less than one wavelength. If elements are this close then the input lens array 105 and its array of lenslets 106-1, 106-2, 106-3, . . . , 106-$n$. are not used. However, in other embodiments, the optical couplers 104 may be spaced apart by more than one wavelength, including tens or hundreds of wavelengths. In these cases, then the input lens array 105 is used.

The illustrated embodiment includes an array of 32×32 optical couplers 104 with 100 μm spacing.

Figure 4:
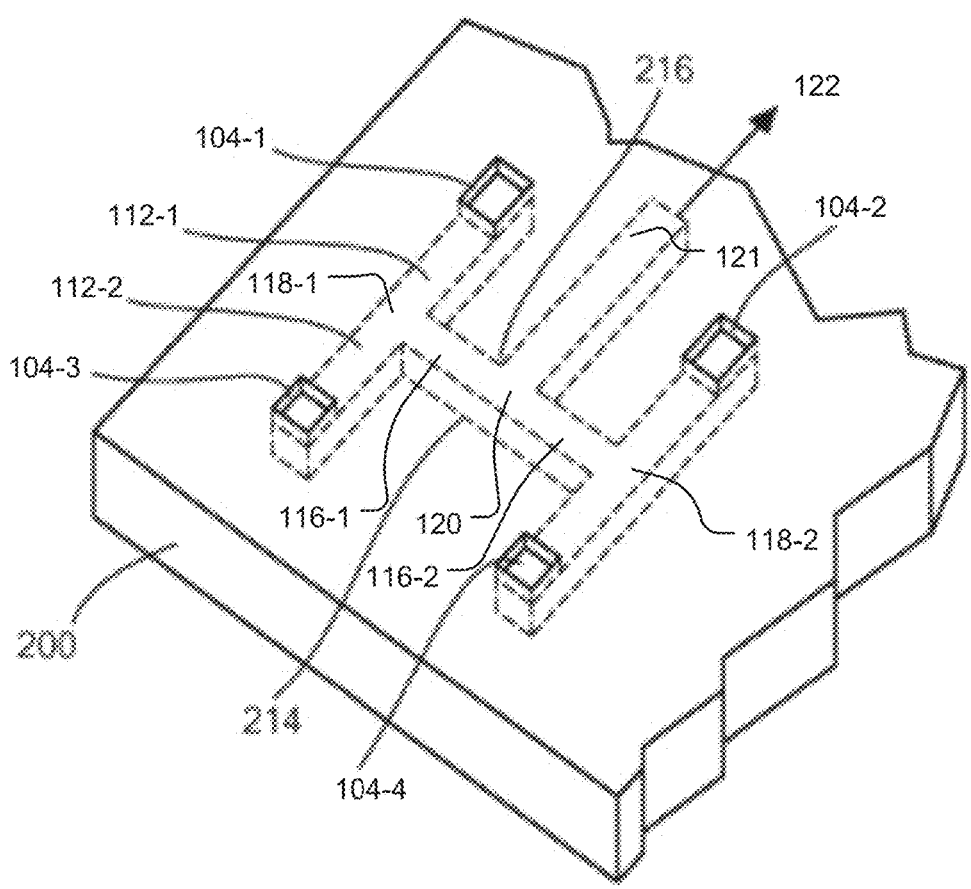
FIG. 4 is a schematic perspective illustration of a portion of a combining waveguide tile.

FIG. 4 is a schematic perspective illustration of a building bloc portion of a combining waveguide tile 100 of FIG. 3. Specifically four optical input couplers 104-1, 104-2, 104-3, and 104-4 are arranged in an array. These optical couplers 104-1, 104-2, 104-3, 104-4 feed the first level waveguides 112-1, 112-2, 112-3, 112-4. The first level waveguides 112 terminate in first level combiners 118-1, 118-2. These first level couplers feed second level waveguides 116-1, 116-2, which terminate in a second level combiner 120. The second level combiner in turn feeds a third level waveguide 121.

Design of the optical combiners, such as optical combiners 118, 120, 122, 126, 128, 132, and 134, should be selected for low loss and coherent power combination. For example, multi-mode interferometers (MMI), which are compact and perform over somewhat large bandwidths, may be used as optical combining/splitting elements. Other possible combiner/splitter designs that are possible are adiabatic couplers, resonant couplers, and hybrid-ring combiners.

Figure 5A:
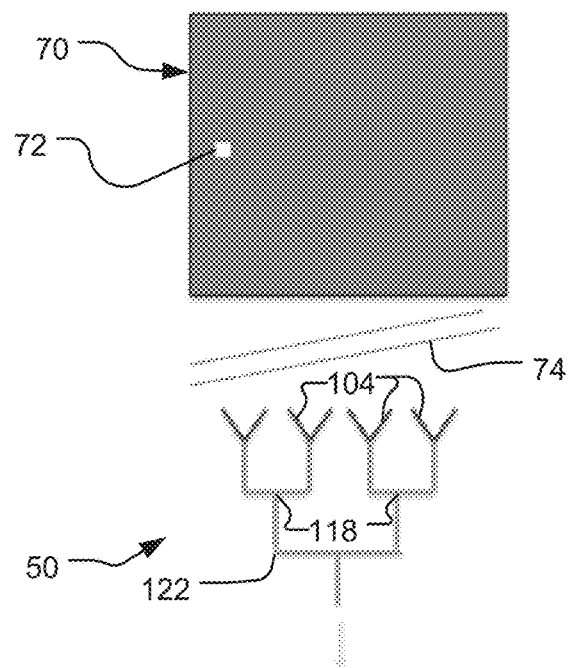
FIGS. 5A and 5B are schematics of an embodiment of phase shifters effecting steering of the field-of-view.
Figure 5B:
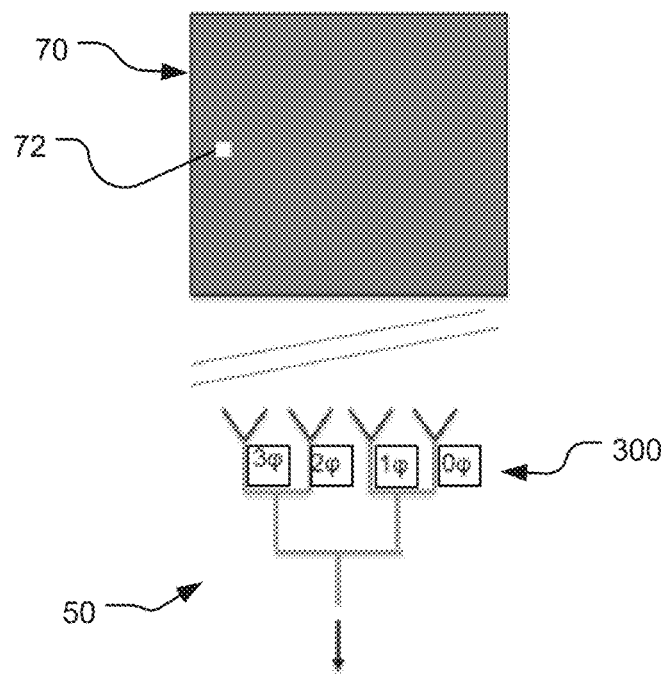

FIGS. 5A and 5B illustrate the operation of a preferred embodiment in which phase shifters are provided for each input optical couplers 104 in order to provide for the steering of the field-of-view.

In more detail, with respect to FIG. 5A, consider the downrange view 70 for a matched pathlength combining waveguide array 50. Light received from the object of interest 72 has a tilted wavefront from the perspective of the matched pathlength combining waveguide array 50. As a result, light from the object of interest 72 will not be in-phase and thus will destructively interfere in the cascade of combiners 118, 122, etc in each tile 100.

FIG. 5B shows the addition of a phase shifting system 300 within the matched pathlength combining waveguide array 50. The field-of-view of the waveguide array 50 is steered by adding a phase shift to the feeds from each of the input optical couplers 104. It is thus possible to steer to the field-of-view.

The phase shifting system 300 compensates for the tilted wavefront 74 of off-axis light and allows off-axis light to constructively interfere within the cascade of combiners 118, 122.

As shown, the phase shifting system 300 imparts a different, but predictable phase shift to the feeds from each input optical coupler 104.

Of note is the fact that all the tiles 100 on the matched pathlength combining waveguide array 50 require (precisely) the same phase shifts; so it is possible to control all the all the tiles 100 in the array 50 with the same drive electronics.

FIGS. 6A-6D show the results of a simulation illustrating how the field-of-view can be steered.

Figure 6A:
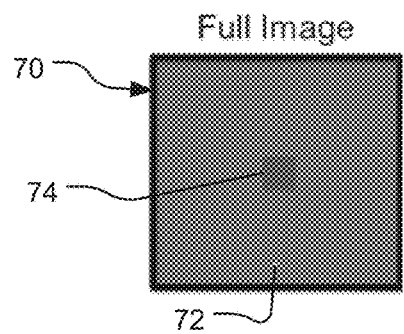
FIGS. 6A-6D show the results of a simulation illustrating how the field-of-view can be steered.

FIG. 6A shows the case without steering. Shown is the downrange view 70. The object of interest 72 is in the lower part of the view. The field-of-view 74 of the imaging system 10 is in the center of the downrange view 70.

Figure 6B:
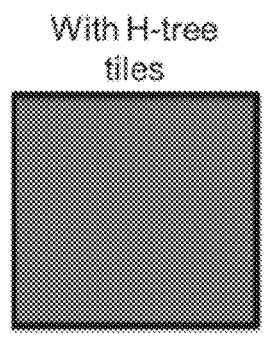

FIG. 6B shows the light output from the unsteered array 50. There is nothing in the image since no light escapes the matched pathlength combining waveguide array 50.

Figure 6C:

FIG. 6C shows the case with steering. Shown is the downrange view 70. The object of interest 72 is in the lower part of the view. The field-of-view 74 of the imaging system 10 is steered to be coincident with the object of interest 72.

Figure 6D:
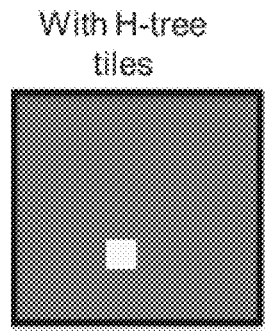

FIG. 6D shows the light output from the steered array 50. Now there is an image since light from the object of interest 72 escapes through the matched pathlength combining waveguide array 50.

Figure 7:
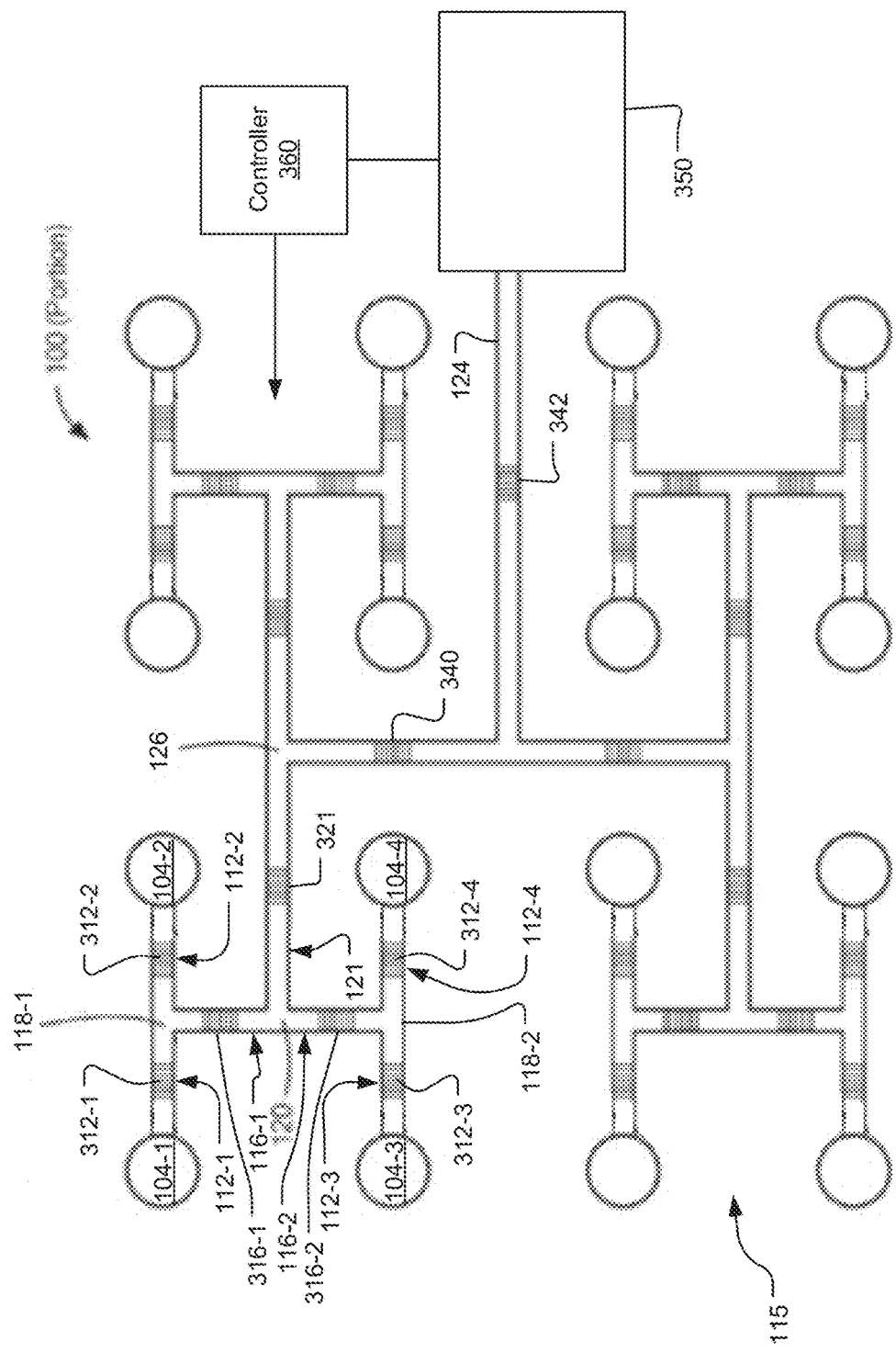
FIG. 7 is a schematic diagram showing the implementation of the phase shifting system.

FIG. 7 is a schematic diagram showing the implementation of the phase shifting system 300 into the branching waveguide network 115 of a portion of a tile 100.

The optical waveguides 112, 116, 121 of each of the respective levels include respective exemplary pathlength tuners 312, 316, 321. These pathlength tuners 312, 316, 321 provide dynamically tunable optical delays for the optical signal exiting each level of optical combiners 118, 120, 126.

In one implementation, the pathlength tuners 312, 316, 321 are heated sections of the waveguides, controlling the index of refraction.

Heaters are preferably fabricated in the waveguide chip 202. The amount of heat generated by each heater is controlled by the phase controller 360, which also controls the phase jump tuner 350. Thus, each dynamically tunable optical delay line includes a thermally phase-tunable optical delay line.

In should be noted that in some embodiments, trimming portions are additionally included into the optical waveguides 112, 116, 121. Each trimming section is made of a material whose refractive index can be permanently changed, such as by annealing the material in the trimming section. Thus, the waveguides of the array can be adjusted as part of a manufacturing/calibration operation to ensure matching optical delays within the branching waveguide network 115 of each tile 100.

In the illustrated example, the feeds from input optical couplers 104-1 and 104-2 are combined in first level combiner 118-1. The relative delay between these feeds is controlled by pathlength tuners 312-1 and 312-2 under the control of the phase controller 360. In a similar way, feeds from input optical couplers 104-3 and 104-4 are combined in first level combiner 118-2. The relative delay between these feeds is controlled by pathlength tuners 312-3 and 312-4 also under the control of the phase controller 360.

Then delay in the signals at the second level combiners 120 can also be tuned. For example, the delay of the light from combiner 118-1 is modulated by the control of the pathlength tuners 316-1 and the delay of the light from combiner 118-2 is modulated by the control of the pathlength tuners 316-2. In the illustrated embodiment subsequent pathlength tuners 340 and 342 are provided to enable pathlength control deeper in the network 115 to further facility steering control via the phase controller 360.

Figure 8:
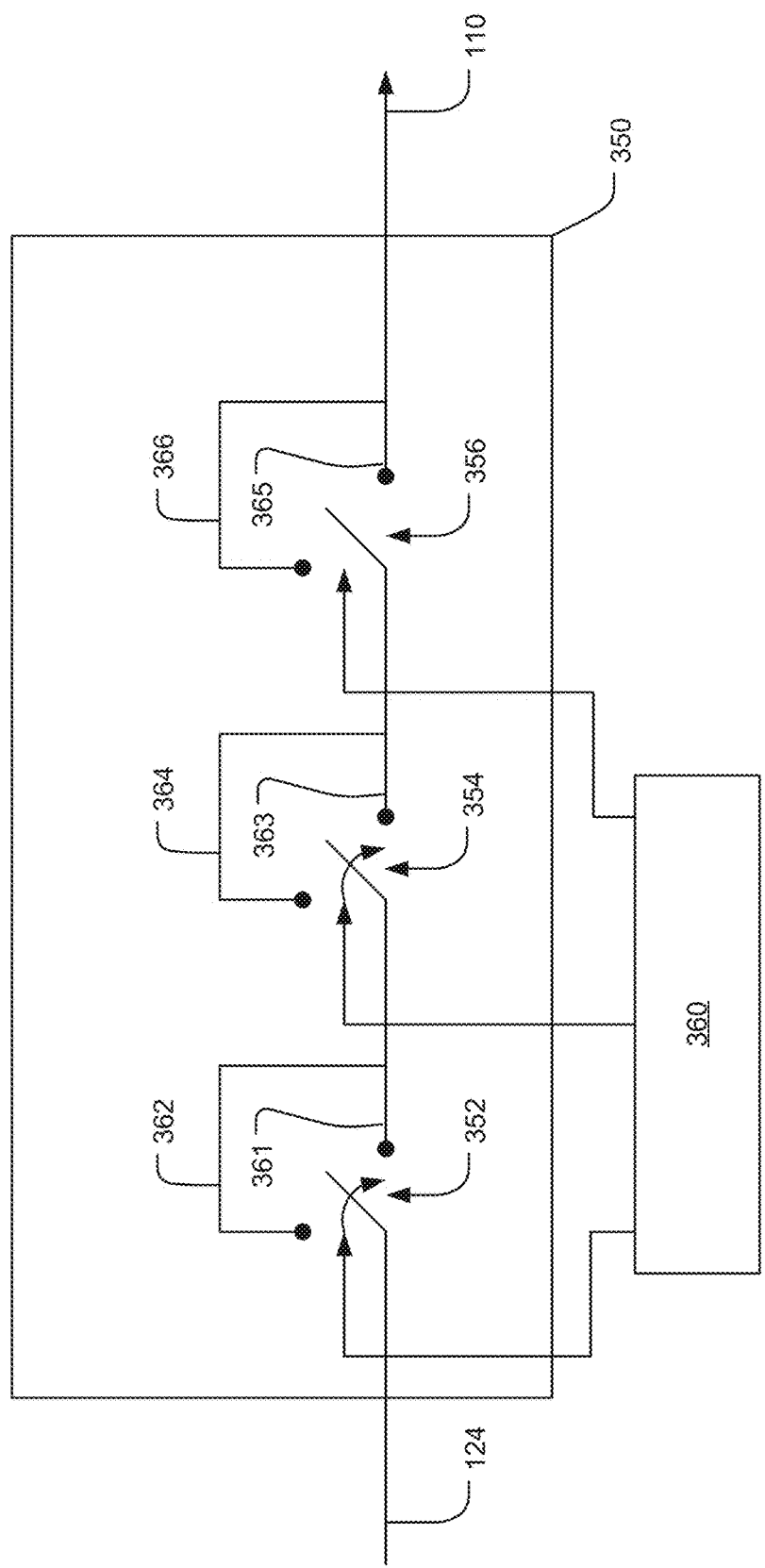
FIG. 8 is a schematic showing the details of a phase jump tuner.

FIG. 8 shows the details of one embodiment of the phase jump tuner 350 that provides additional phase adjustment for each tile 100.

It is anticipated that that the pathlength tuners 312, 316, 321 within the waveguides will be able to compensate for the tilted wavefront across the extent of a tile. However, to compensate for the tilted wavefront across the extent of the matched pathlength combining waveguide array 50, each tile 100 will need to provide incremental jumps in phase.

In one embodiment, the phase jump tuner 350 comprises a series of optical switches 352, 354, 356 that switch the optical signal on the root waveguide 124 from the branching network 115 between respective short paths 361, 363, 365, and long paths 362, 364, 366. In this way, increments of delay can be added for each tile 100 under the control of the phase controller 360 to facilitate steering to higher angles.

While this invention has been particularly shown and described with references to preferred embodiments thereof, it will be understood by those skilled in the art that various changes in form and details may be made therein without departing from the scope of the invention encompassed by the appended claims.

What is claimed is:

1. An imaging system comprising:
a matched pathlength combining waveguide array including input optical couplers for receiving light, combining waveguides for combining the light received from different input optical couplers and relaying the light to output optical couplers; and
a lens system for imaging the light from the output optical couplers.

2. An imaging system as claimed in claim 1, wherein the matched pathlength combining waveguide array comprises a series of matched pathlength combining waveguide tiles, each comprising a multiple input couplers feeding an output coupler.

3. An imaging system as claimed in claim 2, wherein each of the tiles comprises at least 4 or 8 or more input optical couplers for every output coupler.

4. An imaging system as claimed in claim 1, further comprising at least 4 by 4 array of the tiles.

5. An imaging system as claimed in claim 1, further comprising at least 64 by 64 array of the tiles.

6. An imaging system as claimed in claim 1, wherein the combining waveguides comprise waveguides for guiding the light to optical combiners that combine the light from multiple waveguides.

7. An imaging system as claimed in claim 1, wherein each of the tiles includes a phase shifting system for shifting the phase of the light to steer a field-of-view.

8. An imaging system as claimed in claim 7, wherein the phase shifting system includes a phase jump tuner for providing incremental phase shifts to enable steering to higher angles.

9. An imaging method comprising:
receiving light at an array input optical couplers;
combining the light from the input optical couplers in a matched pathlength combining waveguide array;
emitting the combined light from output optical couplers; and
imaging the light from the output optical couplers.

10. An imaging method as claimed in claim 9, wherein the matched pathlength combining waveguide array comprises a series of matched pathlength combining waveguide tiles, each comprising a multiple input couplers feeding an output coupler.

11. An imaging method as claimed in claim 10, wherein each of the tiles comprises at least 4 or 8 or more input optical couplers for every output coupler.

12. An imaging method as claimed in claim 10, further comprising at least 4 by 4 array of the tiles.

13. An imaging method as claimed in claim 10, further comprising at least 64 by 64 array of the tiles.

14. An imaging method as claimed in claim 9, wherein combining the light comprises guiding the light to optical combiners that combine the light from multiple waveguides.

15. An imaging method as claimed in claim 9, further comprising shifting the phase of the light in the waveguide array to steer a field-of-view.

16. An imaging method as claimed in claim 9, further comprising providing incremental phase shifts to enable steering to higher angles.

17. An imaging system comprising:
a waveguide array including input optical couplers for receiving light and relaying the light to output optical couplers;
a lens system for imaging the light from the output optical couplers; and
a phase shifting system for shifting the phase of the light to steer a field-of-view.

18. An imaging system as claimed in claim 17, wherein the phase shifting system includes a phase jump tuner for providing incremental phase shifts to enable steering to higher angles.

19. An imaging method comprising:
receiving light at an array input optical couplers and coupling the light into a waveguide array;
shifting the phase of the light in the waveguide array to steer a field-of-view;
emitting the light from output optical couplers; and
imaging the light from the output optical couplers.

20. An imaging method as claimed in claim 19, further comprising providing incremental phase shifts to enable steering to higher angles.

* * * * *